United States Patent [19]

Hennings et al.

[11] Patent Number: 4,692,289

[45] Date of Patent: Sep. 8, 1987

[54] METHOD OF MANUFACTURING VOLTAGE-DEPENDENT RESISTOR

[75] Inventors: Detlev Hennings; Axel Schnell; Herbert Schreinemacher, all of Aachen, Fed. Rep. of Germany

[73] Assignee: U.S. Philips Corporation, New York, N.Y.

[21] Appl. No.: 753,757

[22] Filed: Jul. 11, 1985

Related U.S. Application Data

[62] Division of Ser. No. 382,910, May 28, 1982, Pat. No. 4,581,159.

[30] Foreign Application Priority Data

May 29, 1981 [DE] Fed. Rep. of Germany ....... 3121289

[51] Int. Cl.[4] .............................................. C04B 33/34

[52] U.S. Cl. ...................................... 264/61; 252/520; 252/521; 338/20

[58] Field of Search .................. 264/61; 252/520, 521; 338/20

[56] References Cited

U.S. PATENT DOCUMENTS

| | | | |
|---|---|---|---|
| 4,237,084 | 12/1980 | Payne et al. | 264/61 |
| 4,347,167 | 8/1982 | Payne et al. | 252/520 |
| 4,405,477 | 9/1983 | Murase | 252/62.3 BT |
| 4,419,310 | 12/1983 | Burn et al. | 264/61 |
| 4,436,650 | 3/1984 | Bowen | 252/518 |
| 4,438,214 | 3/1984 | Masuyama et al. | 252/520 |
| 4,541,974 | 9/1985 | Yamaoka et al. | 264/61 |

FOREIGN PATENT DOCUMENTS 0044981 2/1982 European Pat. Off. .

*Primary Examiner*—James Derrington
*Attorney, Agent, or Firm*—Norman N. Spain

[57] ABSTRACT

A voltage-dependent resistor having a low operational field strength with a ceramic sintered body on the basis of a polycrystalline alkaline earth metal titanate doped with a small quantity of a metal oxide so as to produce an N-type conductivity, in which the sintered body comprises at its grain boundaries insulating layers formed by in-diffusion of at least a metal oxide or at least a metal oxide compound and comprises of an alkaline earth metal titanate having Perowskite structure of the general formula:

$$(A_{1-x}Ln_x)TiO_3 \cdot yTiO_2 \text{ or } A(Ti_{1-x}Me_x)O_3 \cdot yTiO_2$$

wherein: A=alkaline earth metal; Ln=rare earth metal; Me=metal having a valency of 5 or more; $0.0005 < x <$ solubility limit in the Perowskite phase; $y = 0.001$ to $0.02$. The insulating layers are formed in that the sintered body is covered on its surface with a suspension containing at least a metal oxide having a comparatively low melting-point as compared with the sintered body or at least a metal oxide compound having a comparatively low melting-point with respect to the sintered body and is tempered in an oxidizing atmosphere at a temperature which is above the melting-point of the suspension component(s).

12 Claims, 3 Drawing Figures

METHOD OF MANUFACTURING VOLTAGE-DEPENDENT RESISTOR

This is a division of application Ser. No. 382,910, filed May 28, 1982, now U.S. Pat. No. 4,581,159, issued Apr. 8, 1986.

The invention relates to a voltage-dependent resistor having a ceramic sintered body on the basis of a polycrystalline alkaline earth metal titanate doped with a small quantity of a metal oxide so as to produce an N-type conductivity having electrodes provided on oppositely located surfaces, and a method of manufacturing such a resistor.

From EP Patent Application No. 40,881 a voltage-dependent resistor is known which is based on N-type strontium titanate to which prior to sintering a small quantity of a lead germanate phase with added which leads to the formation of insulating grain boundaries in the polycrystalline grain texture of the sintered body. Due to its comparatively high operational field strength—a current density, for example, of approximately 3 mA/cm$^2$ is obtained only with fields of approximately 6 kV/cm—this known resistor has only a limited field of application; for example, it is not suitable for modern semiconductor switching circuits operating at low voltages.

It is the object of the invention to provide a voltage-dependent resistor as mentioned in the opening part of the claim and a method of manufacturing same in such manner that a voltage-dependent resistor having a low operational field strength is obtained.

According to the invention this object is achieved in that the sintered body comprises at its grain boundaries insulating layers formed by diffusion into surface layers of these grains of at least a metal oxide or at least a metal oxide compound, the sintered body in its initial state consisting of an alkaline earth metal titanate having Perowskite structure of the general formula $$(A_{1-x}Ln_x)TiO_3.yTiO_2 \text{ or } A(Ti_{1-x}Me_x)O_3.yTiO_2,$$

wherein:

A = alkaline earth metal; Ln = rare earth metal;

Me = metal having a valency of 5 or more; $0.0005 < x < $ solubility limit in the Perowskite phase; y = 0.001 to 0.02.

A method of manufacturing a voltage-dependent resistor having a ceramic sintered body on the basis of a polycrystalline alkaline earth metal titanate doped with a small quantity of a metal oxide so as to produce an n-type conductivity is characterized in that first the sintered body is manufactured in a reducing atmosphere, that said sintered body is then covered at its surface with a suspension comprising at least a metal oxide of a comparatively low melting-point as compared with the sintered body or at least a metal oxide compound having a comparatively low melting-point as compared with the sintered body, and is then tempered in an oxidizing atmosphere, preferably in air, at a temperature which is above the melting-point of the suspension component(s).

The voltage-dependent resistor according to the invention is distinguished by an operational field strength which is lower by the factor > 10 as compared with the known voltage-dependent resistor. Several factors are of importance: first the sintered body is manufactured under the influence of a small $TiO_2$ excess and secondly it has insulating layers formed by diffusion into surface-layers of these grains of a metal oxide which has a melting-point below that of the sintered body or a metal oxide compound which has a melting-point below that of the sintered body. These insulating layers may have a gradient from the boundary zone of the sintered body over the thickness of the sintered body. The $TiO_2$ excess of the starting material for the sintered body leads to a grain growth in addition to the sintering conditions, to be considered is essentially the sintering temperature, and in addition to the concentration of the doping. The grain size of the polycrystalline structure has a decisive influence on the operational field strength of the voltage-dependent resistor (hereinafter termed varistor). The smaller the grain size, the higher generally is the operational field strength. This is a decisive advantage as compared with the known voltage-dependent resistor in which only a small grain growth is possible. It is to be noted, however, that at a low operational voltage the current index $\beta$ of the resistor assumes more and more unfavourable values. The current index $\beta$ is obtained from the formula $U = C \cdot I\beta$, wherein:

I = current through the varistor in ampères; U = voltage drop at the varistor in volts; C = geometry-dependent constant; it indicates the voltages at I = 1 A (in practical cases it may assume values between 15 and a few thousand); $\beta$ = current index, coefficient of nonlinearity or control factor. It depends on the material and is a measure of the steepness of the current-voltage characteristic. Preferably the value $\beta$ must be as small as possible because at a small value for $\beta$ strong current variations lead only to small voltage variations at the varistor.

According to an advantageous further embodiment of the invention the insulating layers are formed from at least a metal oxide or at least a metal oxide compound which has a lower melting-point than the Perowskite phase, which thoroughly wets the polycrystalline Perowskite phase at its grain boundaries and which at field strengths occurring during operation of the component shows reversible breakdown phenomena. As a result of the simultaneous presence of these parameters good varistor properties are obtained on the basis of influences at the grain boundaries.

According to an advantageous further embodiment of the invention the alkaline earth metal titanate is formed by conversion of $SrCO_3$ with $TiO_2$ in the molar ratio 1:1.001 to 1:1.02 with the addition of the doping metals in the form of their oxides in a quantity of 0.05 to at most 60 mol % of the component to be substituted after grinding and presintering at 1150° C. in air for 15 hours.

After grinding and granulating this sintered product succeeded by compression of the ground product to form a moulded body suitable for a resistor, according to a further advantageous embodiment of the invention it is sintered at a temperature of 1460° C. for 4 hours in a reducing atmosphere consisting of water vapour-saturated mixed gas of 90% by volume of $N_2$ and 10% by volume of $H_2$.

According to further advantageous modified embodiment of the invention are used as a doping metal oxide $La_2O_3$, $Nb_2O_5$ or $WO_3$ and as a diffusing metal oxide $Bi_2O_3$ or as a diffusing metal oxide compound lead germanate $Pb_5Ge_3O_{11}$.

$La^{3+}$-, $Nb^{5+}$- and $W^{6+}$-ions have proved to be particularly suitable for the n-doping. However, other dopings are also feasible, for example, other rare earth metal ions such as $Sm^{3+}$ but also $Y^{3+}$; instead of $Nb^{5+}$ may be used $Ta^{5+}$, $As^{5+}$ or $Sb^{5+}$ and instead of $W^{6+}$ may be used $Mo^{6+}$ and $U^{6+}$.

In accordance with their ion radius, the doping ions are incorporated either in Sr-places or Ti-places in the Perowskite lattice. Relevant investigations have demonstrated that the large $La^{3+}$-ion ($r_{La^{3+}}=0.122$ nm) is incorporated in an Sr-place ($r_{Sr^{2+}}=0.127$ nm). Analogous studies with $PbTiO_3$ have demonstrated that the smaller $Nb^{5+}$-ion ($r_{Nb^{5+}}=0.069$ nm) is incorporated in Ti-places ($r_{Ti^{4+}}=0.064$ nm). For the $W^{6+}$-ion ($r_{W^{6+}}=0.062$ nm) it may be assumed correspondingly that it is incorporated also in Ti-places.

Only when sintering of the sintered body takes place in a reducing atmosphere do the donor charges directly contribute to the conductivity. This condition is referred to as electron compensation. The chemical characterization of such electron-compensated semiconductor Perowskite samples with N-doping reads for the dopings of the present ceramic $$Sr_{1-x}La_x^{\cdot}TiO_3,\ Sr(Ti_{1-x}Nb_x^{\cdot})O_3 \text{ and } Sr(Ti_{1-x}W_x^{\cdot\cdot})O_3$$

($\cdot$=symbol for donor electron). When after sintering a suspension with at least a metal oxide having a melting-point below that of the sintered body or at least a metal oxide compound having a melting point below that of the sintered body, for example $Bi_2O_3$ or lead germanate $Pb_5Ge_3O_{11}$ in an organic binder, is provided on the sintered body and fired in oxidizing condition at temperatures around or above 900° C., the provided molten metal oxide or the metal oxide compound diffuses preferably along the grain boundaries into the semiconductor ceramic and produces there highly insulating grain boundary layers.

Embodiments of the invention will be described with reference to the drawing and will be explained in their operation. In the drawing.

Figure 1:
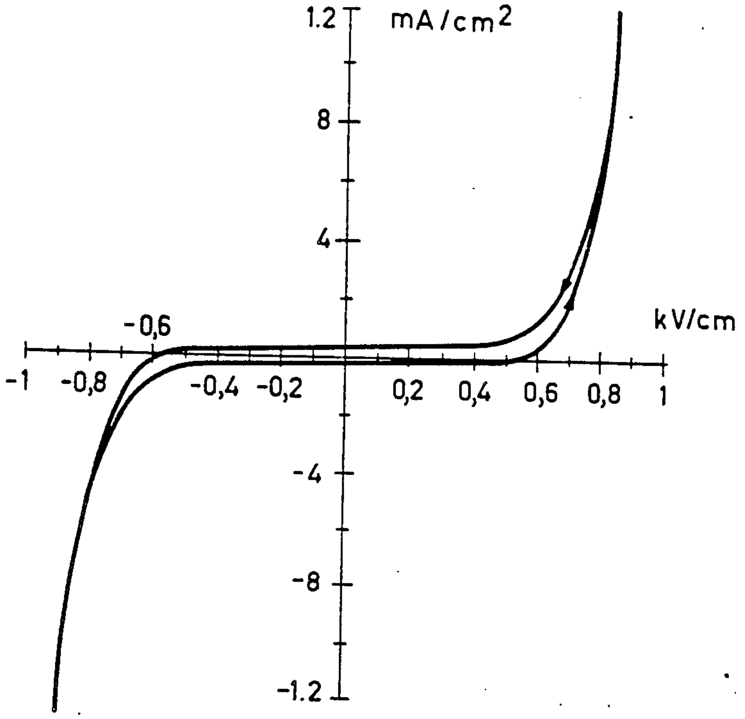
FIGS. 1 and 2 show current-voltage characteristics of different varistors according to the invention.

FIG. 1 shows the current-voltage characteristic of a varistor of the composition $Sr(Tu_{0.996}W_{0.004})O_3.0.01TiO_2$ and a diffused phase of $Pb_5Ge_3O_{11}$. Plotted is the current density in mA/cm$^2$ against the field strength across the component in kV/cm (thickness of the sintered body 400 μm; diameter of the sintered body 5 mm=0.196 cm$^2$). It appears from FIG. 1 that a current density of approximately 3 mA/cm$^2$ is obtained already at comparatively low fields of approximately 0.7 kV/cm. The varistor according to the invention is thus distinguished from the known varistor by an operational field strength which is a factor >10 lower. As a result of this the present varistor can be used in particular for modern semiconductor switching circuits operating at low voltages. A comparable behaviour is found also in Nb-doped and La-doped $SrTiO_3$-varistors according to the invention.

Figure 2:
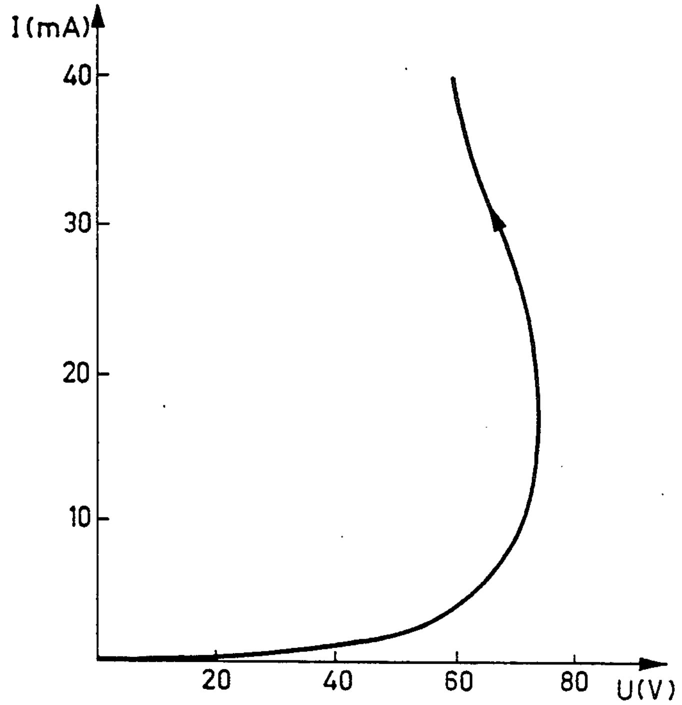

FIG. 2 shows the current-voltage characteristic of a varistor of the composition $Sr(Ti_{0.996}W_{0.004})O_3.0.01TiO_2$ with an in-diffused phase of $Bi_2O_3$. Plotted is the current in mA against the voltage in volts. The negative curve of the characteristic begins from approximately 17 mA.

Figure 3:
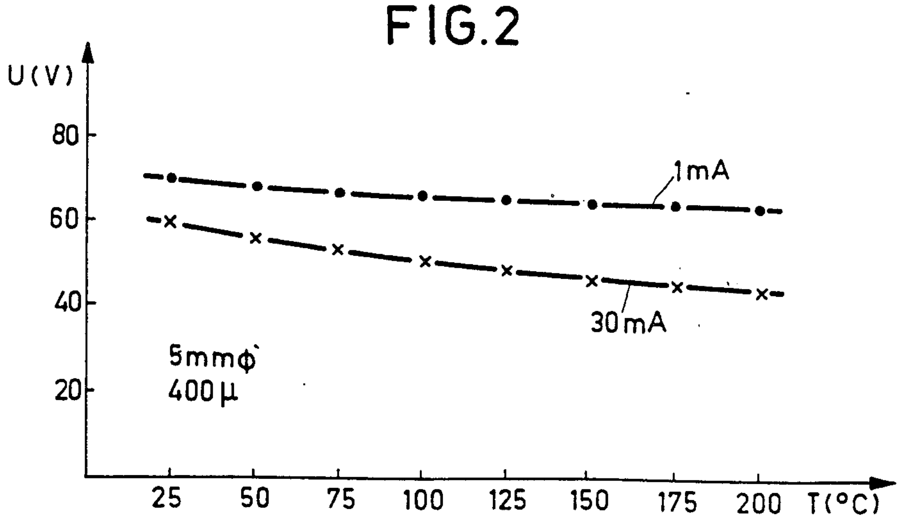
FIG. 3 shows a curve of the temperature dependence of the voltage across a varistior according to the invention at 1 mA and 30 mA.

FIG. 3 shows the voltage at a varistor of the composition $Sr(Ti_{0.996}W_{0.004})O_3.0.01TiO_2$ with an indiffused phase of $Bi_2O_3$ at 1 mA and 30 mA in accordance with the temperature. The sintered body of this varistor had a thickness of 400 μm and a diameter of 5 mm=0.196 cm$^2$.

The manufacture of voltage-dependent resistors according to the invention will be described hereinafter:

1. Manufacture of the ceramic sintered bodies:

As starting materials for the ceramic sintered body were used $SrCO_3$, $TiO_2$ and as doping metal oxides were used $La_2O_3$ or $Nb_2O_5$ or $WO_3$. In the preparation of the ceramic mass according to the compositions $$(Sr_{1-x}La_x)TiO_3.yTiO_2,\ Sr(Ti_{1-x}Nb_x)O_3.yTiO_2$$

or $$Sr(Ti_{1-x}W_x)O_3.yTiO_2$$

with 0,0005<x<solubility limit in the Perowskite phase and y=0.001 to 0.02 attention should be paid that the $TiO_2$-excess with 0.001 to 0.02 has been chosen so as to always have a small excess of $Ti^{4+}$-ions. As a result of this addition a liquid phase with the $SrTiO_3$ is formed upon sintering above 1400° C.—it is to be assumed that said phase consists of the eutectic $SrTiO_3$-$TiO_2$ occurring at ≈1440° C. which eutectic can occur also at lower temperatures by the addition of dopants. A liquid phase of this type promotes the growth of coarse grains, which, as already explained, is desired.

The raw materials are weighed in in a quantity which corresponds to the desired composition and are mixed wet for 2 hours in a ball mill, for example, of agate. Presintering at 1150° C. for 15 hours in air is then carried out. The presintered powders are again ground wet (1 hours in a ball mill, for example of agate). The ground product is then dried and the resulting powders are then granulated by means of a suitable binder, for example, a 10% aqueous polyvinyl alcohol solution. The granulate is compressed to form moulded bodies suitable for ceramic resistors, for example, discs having a diameter of ≈6 mm and a thickness of ≈0.50 mm on a green density (density after compression) of approximately 55 to 60% of the theoretical density. Sintering of the pressed product is then carried out at a temperature of 1460° C. for 4 hours in a reducing atmosphere. The atmosphere may consist, for example, of water vapour-saturated mixed gas of 90% by volume of $N_2$ and 10% by volume of $H_2$. Since the oxygen partial pressure of the mixed gas is determined by the ratio of the two partial pressures $p_{H2}/p_{H2O}$, the mixed gas was saturated with $H_2O$ at ≈25° C. so as to create an always comparable reduction atmosphere.

As regards the sintering it is remarkable that coarse-granular grain textures occur preferably at sintering temperatures above 1440° C. The reducing sintering is to be carried out in a tight furnace, for example, a tubular furnace is suitable. Excessive reducing gas preferably is to flow away via a bubble counter so as to create an always equal sintering atmosphere.

Sintered bodies manufactured in this manner are semiconductive and show no open porosity any more.

2. Manufacture of the insulating layers at the grain edge areas of the polycrystalline Perowskite phase:

The insulating grain edge layers are produced by diffusion of at least a molten metal oxide or at least a metal oxide compound, for example, $Bi_2O_3$ or lead germanate $Pb_5Ge_3O_{11}$, in air into the sintered perowskite ceramic. The metal oxide or the metal oxide compound is first suspended in a binder on the basis of polyvinyl acetate and provided on the already sintered ceramic. The suspended metal oxide or the suspended metal oxide compound is then diffused into the sintered body by a tempering process at a temperature at which they are in the molten state. With the metal oxide $Bi_2O_3$ used (melting point: ≈825° C.) or the metal oxide compound $Pb_5Ge_3O_{11}$ (melting-point: ≈710° C.) the minimum tempering temperature used was a temperature slightly above the melting-point of the metal oxide or metal oxide compound used. The quantities of the metal oxide or metal oxide compounds diffused in the sintered bodies were each time determined in parallel experiments by weighing the sintered bodies prior to providing the suspension, after firing the binder in air at 600° C. and after tempering.

Tempering was carried out in different manners:

(a) at a fixed tempering time of 120 minutes different sintered bodies were each time heated at temperatures of 900° C., 1000° C., 1100° C., 1200° C. and 1300° C.;

(b) at a fixed temperature of 1100° C. different sintered bodies were tempered each time for a duration of 5 minutes, 30 minutes, 60 minutes, 120 minutes and 240 minutes;

(c) the sintered bodies were heated at a tempering temperature of 1200° C. for a tempering duration of 120 minutes (standard conditions).

The heating and cooling times for all experiments were uniformly 100 minutes.

3. Manufacture of voltage-dependent resistors:

On sintered bodies prepared as described above, electrodes of suitable metals, preferably of gold, were provided, for example by vapour deposition, so as to form a resistive component. For better adhesion of the electrode metal it is recommendable first to provide on the ceramic sintered body a suitable adhesive layer as an intermediate layer between ceramic and electrode metal; a Cr-Ni layer is suitable, for example.

Remarks to special compositions:

$(Sr_{1-x}La_x)TiO_3.yTiO_2$ (0.0005<x<solubility limit of the La in the Perowskite phase; y=0.001 to 0.02): when x<0.0005, the bodies to be sintered oxidize too rapidly, the reproducibility of the results is no longer ensured. The upper limit of x appears from the solubility limit of the La in the Perowskite phase. Optimum results were obtained with sintered bodies which had a grain texture with grains of a diameter of 80 to 120 μm with x=0.01 and y=0.01 at a sintering temperature of 1460° C. in a reducing atmosphere.

$Sr(Ti_{1-x}Nb_x)O_3.yTiO_2$ (0.0005<x<solubility limit of the Nb in the Perowskite phase; y=0.001 to 0.02): for the lower limit if x the same applies as described above for the La dopings; from x≈0.03 and more, homogeneous microstructures are no longer observed reproducibly. Optimum results were achieved with sintered bodies having a grain texture with grains of a diameter of 60 to 80 μm with x=0.01 and y=0.01 at a sintering temperature of 1460° C. in a reducing atmosphere.

$Sr(Ti_{1-x}W_x)O_3.yTiO_2$ (0.0005<x<solubility limit of the W in the Perowskite phase: y=0.001 to 0.02); for the lower limit of x the same applies as described above for the La dopings; from x≈0.01 predominantly fine granular micro-structures were observed, from x≈0.06 and more a deposition of foreign phases in the microstructure increasingly occurs which consists of $SrWO_4$ and $TiO_2$. Optimum results were achieved with sintered bodies which had a grain texture with grains of a diameter of 60 to 80 μm with x=0.004 and y=0.01 at a sintering temperature of 1460° C. in a reducing atmosphere.

4. Results

Results of the diffusion experiments:

Tables 1 to 3 below shows the results of the diffusion experiments with provided suspensions of $Bi_2O_3$ and $Pb_5Ge_3O_{11}$. The sintered bodies used for the diffusion experiments had a diameter of 50 mm and a thickness of approximately 400 μm. At a relative density of the sintered bodies of 97 to 99% of the theoretical density, the average weight of a sintered body was 0.04 gram. The quantity of metal oxide or of metal oxide compound in % by weight calculated on the weight of the sintered body provided on the sintered bodies was denoted as $m_1$ and the quantity present in the ceramic after tempering was denoted as $m_2$.

Results of the electrical measurements:

Tables 1 to 3 show that all materials which had a diffusion phase of $Pb_5Ge_3O_{11}$ show useful VDR-effect (VDR=voltage dependent resistor) which against the parameters of the known varistors are distinguished by an operational field strength which is lower by a factor >10 in approximately the same value for the current index β. Table 2 shows that variations of the tempering duration and of the tempering temperature have no systematic influence on the values for the operational voltage and the current index.

However, different operational voltages of the finished component can be adjusted by different thicknesses of the components.

The sintered bodies with a diffusion phase of $Bi_2O_3$, superimposed on the normal VDR-dependence, show a negative resistance range, that is, when the current increases the voltage across the component decreases, which may be advantageous in certain applications since this corresponds substantially to a value for the current index β<0 (for this purpose reference is made to FIG. 2). As a result of this an excess voltage is limited not only to a given value, but as a result of the decrease of the voltage across the component with increasing current, energy is absorbed additionally in the component. This property of the sintered bodies treated with $Bi_2O_3$ is produced only partly by the heating and the associated resistance decrease of the components. This is shown in FIG. 3 in which the voltage across the component is plotted at 1 mA and 30 mA in accordance with the temperature. The 30 mA values were measured by short current pulses so that a self-heating by the measuring current is negligible.

TABLE 1

| Example | Composition | Diffusion phase | $m_1$ (wt. | $m_2$ %) | Operational voltage $U_{1mA}$ (V) | current index β |
|---|---|---|---|---|---|---|
| 1 | $(Sr_{0.99}La_{0.01})TiO_3.0.01TiO_2$ | $Pb_5Ge_3O_{11}$ | 12 | 0.44 | 2.4 | 0.19 |
| 2 | $(Sr(Ti_{0.99}Nb_{0.01})O_3.0.01TiO_2$ | $Pb_5Ge_3O_{11}$ | 13.5 | 1.4 | 7.5 | 0.15 |
| 3 | $(Sr(Ti_{0.996}W_{0.004})O_3.0.01TiO_2$ | $Pb_5Ge_3O_{11}$ | 12 | 4.1 | 16 | 0.14 |
| 4 | $(Sr_{0.99}La_{0.01})TiO_3.0.01TiO_2$ | $Bi_2O_3$ | 10 | 0.25 | 60 . . . 80 | negative |

TABLE 1-continued

| Example | Composition | Diffusion phase | $m_1$ (wt. %) | $m_2$ (wt. %) | Operational voltage $U_{1mA}$ (V) | current index $\beta$ |
|---|---|---|---|---|---|---|
| | | | | | | charac- teristic |
| 5 | $(Sr(Ti_{0.99}Nb_{0.01})O_3.0.01TiO_2$ | $Bi_2O_3$ | 10.5 | 1.3 | 60 . . . 80 | negative charac- teristic |
| 6 | $(Sr(Ti_{0.996}W_{0.004})O_3.0.01TiO_2$ | $Bi_2O_3$ | 11 | 1.4 | 60 . . . 80 | negative charac- teristic |

For all examples holds uniformly:
Tempering duration: 120 minutes
Tempering temperature: 1200° C.
Diameter of the sintered body: ≈5 mm
Thickness of the sintered body: ≈400 μm

TABLE 2

| Exam- ple | Tempering tempera- ture (°C.) | Composition | Tempering duration (min) | $m_1$ (wt. %) | $m_2$ (wt. %) | Operational voltage $U_{1mA}$ (V) | Current index $\beta$ |
|---|---|---|---|---|---|---|---|
| 3 | 1100 | $Sr(Ti_{0.996}W_{0.004})O_3.0.01TiO_2$ | 5 | 15.2 | 4.2 | 17 | 0.14 |
| | | Diffusion phase | 30 | 17.5 | 4.3 | 17 | 0.13 |
| | | $Pb_5Ge_3O_{11}$ | 60 | 18.2 | 5.3 | 32 | 0.12 |
| | | | 240 | 16 | 4.6 | 14 | 0.13 |
| **Exam- ple** | **Tempering duration (min)** | **Composition** | **Tempering tempera- ture (°C.)** | **$m_1$ (wt. %)** | **$m_2$ (wt. %)** | **Operational voltage $U_{1mA}$ (V)** | **Current index $\beta$** |
| | 120 | $Sr(Ti_{0.996}W_{0.004})O_3.0.01TiO_2$ | 900 | 12.3 | 4.1 | 14 | 0.12 |
| | | Diffusion phase | 1000 | 13.7 | 3.9 | 31 | 0.11 |
| | | $Pb_5Ge_3O_{11}$ | 1100 | 13.2 | 4.5 | 20 | 0.13 |
| | | | 1300 | 13 | 3.5 | 24 | 0.13 |

For both examples holds uniformly:
Diameter of the sintered body: ≈5 mm
Thickness of the sintered body: ≈500 μm

TABLE 3

| Exam- ple | Tempering duration (min) | Composition | Tempering tempera- ture (°C.) | $m_1$ (wt. %) | $m_2$ (wt. %) | Operational voltage $U_{1mA}$ (V) | Current index $\beta$ |
|---|---|---|---|---|---|---|---|
| 6 | 120 | $Sr(Ti_{0.996}W_{0.004})O_3.0.01TiO_2$ | 900 | 15 | 6.4 | 60 . . . 100 | negative charac- teristic |
| | | Diffusion phase | 1000 | 15.5 | 4.8 | | |
| | | $Bi_2O_3$ | 1100 | 16.2 | 2 | | |
| | | | 1300 | 17 | 0.75 | | |

For the example holds:
Diameter of the sintered body: ≈5 mm
Thickness of the sintered body: ≈400 μm

What is claimed is:

1. A method of manufacturing a voltage-dependent resistor having a ceramic sintered body consisting of a polycrystalline alkaline earth metal titanate doped to N-type conductance with a metal oxide and which body is provided with electrodes on opposite located surfaces thereof, has a Perowskite structure, consists of a strontium titanate containing excess $TiO_2$ which titanate has a formula selected from the group consisting of $(Sr_{1-x}Ln_x)TiO_3.YTiO_2$ and $Sr(Ti_{1-x})Me_x)O_3.YTiO_2$ wherein Ln is a rare earth metal, Me is a metal having a valence of at least 5, $0.0005 < x <$ solubility limit of the Ln in the Perowskite crystal phase and Y equals 0.001 to 0.02 and is provided on its grain boundaries with insulating layers produced by diffusion into the surface layers of said grains by a metal oxide or a metal oxide compound, each of said metal oxide and said metal oxide compound having a melting point below that of said sintered body, characterized by the steps of forming a molded product of the starting substances of the composition of said body, sintering said molded product in a reducing atmosphere to form a sintered body, covering the surface of said thus sintered body with a suspension comprising at least a metal oxide or a metal oxide compound each having a melting-point below that of said sintered body and then heating said thus covered sintered body in an oxidizing atmosphere at a temperature which lies above the melting-point of the suspension component(s).

2. A method as claimed in claim 1, characterized by the following operational steps:

(a) grinding a mixture of the starting substances for an alkaline earth metal titanate having Perowskite structure with an addition of a metal oxide having a doping effect so as to produce an N-type conductivity according to the formula:

$$(Sr_{1-x}Ln_x)TiO_3.yTiO_2 \text{ or } Sr(Ti_{1-x}Me_x)O_3.yTiO_2$$

wherein:

Ln = rare earth metal

Me=metal having a valency of 5 or more $0.0005 < x <$ solubility limit in the Perowskite phase $y = 0.001$ to 0.02;

(b) pre-sintering the ground material resulting from step (a) for 2 to 20 hours in the temperature range from 1050° to 1350° C. in air;

(c) grinding and granulating the sintered material resulting from step (b) with a suitable binder;

(d) compressing the ground material resulting from step (c) to form a moulded body suitable for a resistor;

(e) sintering the moulded body resulting from step (d) for 1 to 10 hours at a temperature in the range from 1400° to 1500° C. in a reducing atmosphere;

(f) providing a suspension containing the metal oxide(s) or the metal oxide compound(s) on the surface of the sintered body resulting from step (e)

(g) diffusing the components of the suspension employed in step (f) into the sintered body by heating the suspension provided sintered body resulting from step (f) at temperatures above the melting temperature of the individual suspension component(s) in an oxidizing atmosphere; and (h) providing metal electrodes on oppositely located surfaces of the body resulting from step (g).

3. A method as claimed in claim 2, characterized in that the alkaline earth metal titanate was formed by conversion of $SrCO_3$ with $TiO_2$ in the molar ratio 1:1.001 to 1:1.02 while adding the doping metals in the form of their oxides in a quantity of 0.05 to at most 60 mol % of the constituent to be substituted after grinding and presintering at 1150° C. in air for 15 hours.

4. A method as claimed in claim 2, characterized in that $La_2O_3$ is used as a doping metal oxide.

5. A method as claimed in claim 2, characterized in that $Nb_2O_5$ is used as a doping metal oxide.

6. A method as claimed in claim 2, characterized in that $WO_3$ is used as a doping metal oxide.

7. A method as claimed in claim 2, characterized in that a 10% aqueous polyvinyl alcohol solution is used as a binder.

8. A method as claimed in claim 2, characterized in that the moulded body resulting from step (d) is sintered for 4 hours at a temperature of 1460° C. in a reducing atmosphere consisting of a water vapour-saturated mixed gas of 90% by volume of $N_2$ and 10% by volume of $H_2$.

9. A method as claimed in claim 8, characterized in that the mixed gas is saturated with $H_2O$ at $\approx 25°$ C.

10. A method as claimed in claim 2, characterized in that $Bi_2O_3$ suspended in polyvinyl acetate solution is used as a metal oxide to be diffused into the sintered body according to step (g).

11. A method as claimed in claim 2, characterized in that lead germanate $Pb_5Ge_3O_{11}$ suspended in a polyvinyl acetate solution is used as a metal oxide compound to be diffused into the sintered body according to step (g).

12. The method of claim 2 where the suspension provided on the sintered body is heated in air.

* * * * *